3,010,012
ARC WELDING
Roger W. Tuthill, Mountainside, N.J., assignor to Air Reduction Company, Incorporated, New York, N.Y., a corporation of New York
Filed Dec. 24, 1959, Ser. No. 861,819
13 Claims. (Cl. 219—131)

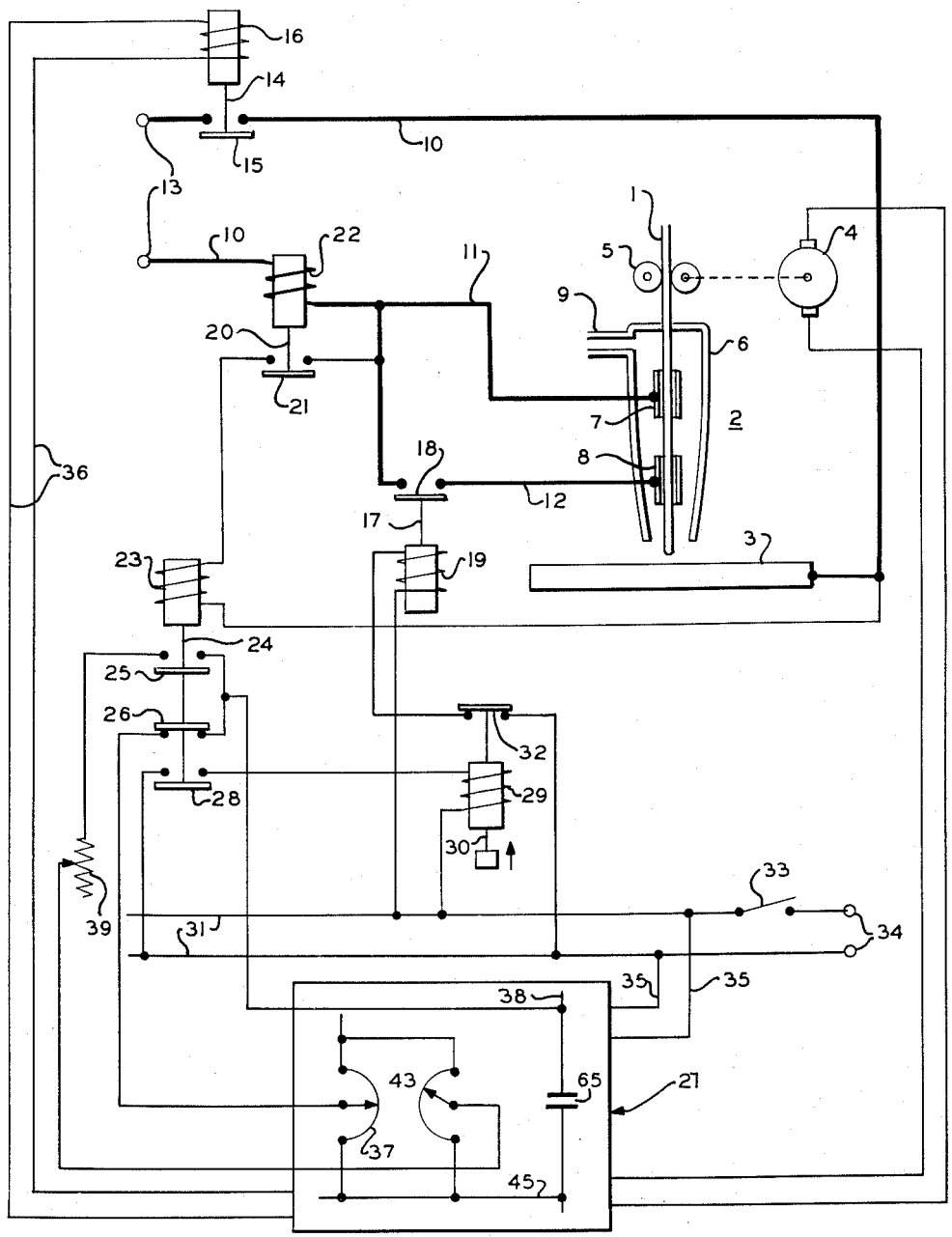

In metal surfacing or overlay work an integral layer of metal of one composition is applied to the surface of a base metal of another composition. A wide variety of characteristics can be secured by a proper choice of the surfacing metal. If the surfacing metal is intended to resist hard wear especially hard surfacing alloys may be used. If the surfacing metal is intended to resist friction type or corrosion wear, bronze or suitable corrosion resisting alloys may be employed. A multitude of alloys and metals are suitable for surfacing operations and most of them can be deposited by any of the conventional manual or automatic welding processes. Thus, for example gas shielded metal arc welding may be employed for metal surfacing in much the same manner as welding is done by this process except for suitable modifications thereof to reduce dilution of the base metal by the surfacing metal.

In electric arc welding it is desirable to operate with an extended electrode stickout to increase the melting rate of the electrode and to decrease penetration of the surfacing metal into the base metal. The expression "electrode stickout" used herein has its well known significance in the art of referring to the portion of the electrode which extends or sticks out beyond the current contact means of the welding torch or other device employed for supplying welding current to the electrode. With an extended electrode stickout the arc current produces a resistance heating of the electrode before the terminal portion of the electrode is subjected to the heat of the arc and the combined effect of resistance heating and arc heating increases the melting rate of the electrode and makes it possible to operate under conditions which reduce the dilution of the base metal by the surfacing metal added thereto by the fusion of the electrode.

With extended electrode stickouts of an inch or more it is usually necessary to guide the electrode stickout in the welding torch after it has left the contact means thereof by which current is normally supplied to the electrode. Especially is this true in a gas shielded arc welding operation where the terminal portion of the electrode must be centered in the gas stream supplied through the nozzle of the welding torch in order to secure the desired shielding of the arc.

When operating with an extended electrode stickout which is suitably positioned in the welding torch by an electrode guide means interposed between the contact means of the torch and the arc supporting terminal of the electrode, it has frequently been found that the electrode either melted or softened between the contact means and the electrode guide means of the torch with the result that the electrode jammed in the guide means or produced an arc in the electrode stickout which fused the electrode and caused it to jam in the guide means. The reason for this is that during starting, the tractive effort needed is high because the wire is accelerating and stubbing against the work; this causes the wire to buckle because it has insufficient column strength. Once a welding arc had been established, the need for high tractive effort is reduced because the wire is up to speed and is not stubbing. It was found that the column strength of the electrode extending through the guide means was sufficient to push it through the guide means once an arc has been established.

It is an object of my invention to provide in arc welding methods and means of initiating a welding operation with a short stickout of the welding electrode and, after the welding arc has been established, increasing the stickout in order to secure the desired welding conditions resulting from employing the extended electrode stickout.

It is also an object of my invention to provide methods and means of arc welding by which any tendency of a fusible electrode to jam in its guide means, interposed between the arc supporting terminal of the electrode and its contact means, is prevented at the time of striking the welding arc.

Further objects and advantages of my invention will become apparent from the following description of one embodiment thereof.

The accompanying drawing is a diagrammatic representation of an arc welding system embodying my invention.

In the system illustrated in the drawing a fusible electrode 1 is fed through a welding torch 2 toward a workpiece 3 by a feed motor 4 driving feed rolls 5 which engage the electrode. The welding torch 2 comprises a nozzle 6 which encloses a contact means 7 normally employed for supplying welding current to the electrode and a guide means 8 which supports the stickout of the electrode in its passage to and through the orifice of the nozzle 6. The electrode guide means 8, in accordance with the illustrated embodiment of my invention, is electrically insulated from the contact means 7 but makes an electrical contact with the electrode stickout. A shielding gas is supplied to the nozzle 6 through a conduit 9 and this gas is discharged about the arc formed between the electrode and the workpiece, the electrode terminal portion, and the molten metal of the workpiece formed in part by the arc fused metal of the workpiece and in part by the arc melted electrode material deposited on the workpiece.

There may be many forms of welding torches embodying the construction above described but I prefer to use a torch such as is shown and described in a United States patent application S.N. 782,474, Ralph D. Engel, for "Welding Torch," filed December 23, 1958, and subsequently issued as Patent 2,951,934 on September 6, 1960. The torch of this application comprises a support for supplying cooling fluid and electric current to a contact means by which the current is supplied to an electrode fed therethrough, and a concentric support about the support for the contact means by which cooling fluid is supplied to an electrically conductive electrode engaging guide means which is electrically insulated by the torch structure from the contact means and positioned between it and the discharge orifice of the nozzle of the torch for directing the electrode through the torch nozzle in the center of a gas stream supplied about the support for the guide means and through the nozzle. For a more detailed description of this gas arc welding torch reference may be had to the disclosure in the above identified Engel patent.

The electrode 1 and the workpiece 3 are connected in series with one another in a welding circuit 10 having branches 11 and 12 electrically connected respectively to the contact means 7 and the electrode guide means 8 of the welding torch 2. This welding circuit 10 is connected to a suitable source of welding current at terminals 13 and the flow of welding current to the welding torch is controlled by a main contactor 14 having normally open contacts 15 and an operating winding 16. The welding circuit through branch 12 of the welding circuit is controlled by an auxiliary welding contactor or switching means 17 having normally open contacts 18 and an operating winding 19. It is thus seen that when the contacts 18 of the switching means 17 are open the total flow of welding current is supplied to the electrode through branch 11 of the welding circuit and the contact means 7 of the welding torch. On the other hand when contacts 18 of switching means 17 are closed a more direct circuit in shunt to the contact means 7 is provided through branch 12 of the welding circuit and the electrode guide means 8, which effectively reduces the electrode stickout portion of the electrode.

Relay 20 of the illustrated system has normally open contacts 21 and an operating winding 22 which is connected in series with the welding circuit so that relay 20 is responsive in its operation to the flow of current in the welding circuit. The contacts 21 of relay 20 connect the operating winding 23 of a voltage relay 24 directly across the connections of the electrode 1 and the workpiece 3 in the welding circuit 10. This relay consequently operates in response to the voltage across the electrode and the workpiece after current flow therethrough has been established by operation of relay 20. Voltage relay 24 has normally open contacts 25 and normally closed contacts 26 which are in control circuits of a two-speed control device 27 for the electrode feed motor 4 and normally open contacts 28 which connect the operating winding 29 of a time delay relay 30 across supply conductors 31. This relay 30 has normally closed contacts 32 which connect the operating winding 19 of the switching means 17 across the supply conductors 31. Relay 30 is a time delay relay operating to open its contacts 32 a predetermined time interval after energization of its operating winding 29.

Supply current conductors 31 are connected through a switch 33 to the terminals 34 of a suitable supply of control voltage employed for operating time delay relay 30 and switching means 17 as well as for supplying through conductors 35 operating voltage for the two-speed control device 27. This control device 27 also provides through conductors 36 energization of the operating winding 16 of the welding contactor 14.

The two-speed control device 27 has the construction illustrated and described in United States Patent No. 2,877,339, James T. Catlett, for "Crater Filler Control for Arc Welding Heads," granted March 10, 1959, suitably modified as illustrated herein to provide a second speed of operation by the provision of a second adjustable potentiometer 37 connected in shunt to the single potentiometer 43 of that patent. As shown in the accompanying drawing, the sliders of potentiometer 37 and 43 are respectively connected through contacts 25 and 26 of voltage relay 24 across the capacitor 65 which is connected by conductors 38 and 45 in the control element circuit of thyratron 23 of the Catlett patent. The capacitor 65 and conductors 38 and 45 illustrated in the accompanying drawing correspond in numeral designations to those employed in the Catlett patent. An adjustable resistor 39 connected in circuit with the slider of potentiometer 43 is provided in the change speed circuit of the two-speed control device 27 so that capacitor 65 in the control element circuit of thyratron 23 of the Catlett patent is not abruptly changed from the voltage derived from potentiometer 37 to that derived from potentiometer 43 when voltage relay 24 operates to shift the connection through its contacts 26 in one control circuit to contacts 25 in the other control circuit of the two-speed control device. This provides for a smooth speed change from the low speed rate at which the electrode feed motor 4 is operated in accordance with the adjustment of potentiometer 37 to the high speed rate determined by the adjustment of potentiometer 43.

The organization of the system just described will be more fully understood from the following consideration of its operation.

It will be assumed that terminals 13 of the welding circuit 10 have been connected to a suitable source of welding current supply and that the terminals 34 of the control circuit conductors 31 have been connected to a suitable source of control voltage such as the 115 volt, 60 cycle supply which is readily available. It will also be assumed that a flow of shielding gas is supplied to the nozzle 6 of the welding torch through conduit 9 which connects the interior of the nozzle to a suitable supply of such gas.

Upon closure of switch 33 the supply conductors 31 are energized from the control voltage source and operating winding 19 of switching means 17 is energized through a circuit connection across supply conductor 31 through the normally closed contact 32 of time delay relay 30.

Switching means 17 consequently will close its contacts 18 connecting branch 12 of the welding circuit 10 in shunt to branch 11 thereof in order to supply welding current directly to the electrode guide means 8 of the welding torch 2. At the same time the control device 27 will be energized through conductors 35, which are connected across supply conductors 31. Initiation of the welding operation can thus be obtained by operating the start switch of control device 27. Upon operation of the start switch of the control device 27, the welding contactor 14 will close its contacts 15 and the feed motor 4 will be energized to feed the electrode 1 toward the workpiece 3 at a speed determined by the adjustment of potentiometer 37 of the control device 27. It is here noted that welding contactor 14 hereof corresponds to welding contactor 19 of the Catlett patent.

The slider of potentiometer 37 is in a control circuit completed through the normally closed contacts 26 of voltage relay 24 across the capacitor 65 of control device 27 which is in the control element circuit of thyratron 23 of the Catlett patent, wherein the same capacitor is identified by the same reference numeral 65. The potentiometer 37 will usually be adjusted to cause the electrode feeding speed of motor 4 to be less than that normally employed for arc welding. The electrode 1 will consequently be fed through contact means 7 and guide means 8 of torch 2 toward the workpiece 3. When the electrode 1 engages the workpiece 3, a welding arc is struck between the electrode and the workpiece by the end of the electrode fusing away. Current is supplied to the electrode at this time primarily through the welding circuit branch 12 and the electrode guide means 8 because of the lower electrical resistance of this path relative to that through branch 11 and the contact means 7. There is consequently no possibility of the electrode jamming or fusing in the electrode guide means 8 which is now serving as the primary contact means of the welding torch with a stickout greatly reduced from that which the electrode would have had if current were supplied thereto through the contact means 7 of the welding torch.

As soon as current flows in the welding circuit, relay 20 is operated to close its contacts 21 which connect the operating winding 23 of the voltage relay 24 across the electrode 1 and the workpiece 3. Consequently, when an arc is established between the electrode 1 and the workpiece 3, relay 24 is operated to open its contacts 26 and to close its contacts 25 and 28. The opening of its contacts 26 interrupts the speed control circuit of control device 27 which has been acting through potentiometer 37 thereof and the closing of its contacts 25 completes a second speed control circuit of control device 27 through its potentiometer 43. This potentiometer 43 is adjusted to cause the electrode feed motor 4 to operate at the desired electrode feeding speed during welding. A change-over from the speed of the feed motor 4 as determined by potentiometer 37 to the speed thereof as determined by potentiometer 43 is cushioned or eased by resistor 39 which controls the charging rate of capacitor 65 from the voltage derived from potentiometer 37 to that derived from potentiometer 43. This will cause the feed motor 4 to have a smooth acceleration from its arc striking speed to its arc welding speed.

A predetermined time interval after the operation of voltage relay 24, time delay relay 30 opens its contacts 32 by reason of the energization of its operating winding 29 upon closure of contacts 28 of voltage relay 24 connecting this winding across the supply current conductors 31. The time delay operation of relay 30 is such that the electrode feed motor welding speed will have been established before relay 30 opens its contacts 32 and de-energizes the operating winding 19 of this switching means 17. When this occurs switching means 17 opens its contacts 18 and transfers the supply of welding current to the contact means 7 of the welding torch so that thereafter the electrode is fed to the workpiece with the extended electrode stickout desired for the welding or overlay operation. It will be noted that transfer of welding current from branch 12 to branch 11 of the welding circuit occurs without interrupting the flow of welding current to the electrode.

The welding operation can be stopped by operating the stop switch of the control device 27 as described in the Catlett patent.

It is quite obvious from what has been stated above that the control device 27 of the Catlett patent as modified to provide a two-speed control is merely illustrative of any electrical or mechanical two-speed control that may be employed for my purposes. It is also apparent that under certain circumstances the arc striking speed of the electrode feed motor may be the same as that employed for arc welding.

It is also apparent that my invention is not limited in its application to gas shielded metallic arc welding but may be employed with any form of arc welding involving operation with an extended electrode stickout. When gas shielded arc welding is employed it is also apparent that the shielding gas may be of any desired nature required by the welding operation being employed. Thus, the shielding gas may be an inert gas such as argon or helium or some other gas such as carbon dioxide or the like. When an inert gas is used a 1–5% addition of oxygen may be employed in order to secure the desired welding action. When a carbon dioxide atmosphere is employed suitable chemical agents may be applied to the electrode so as to secure an axial spray deposit from the electrode during the welding operation. The same spray deposit of electrode material may also be secured in an inert atmosphere when operating at current densities in the electrode suitable for obtaining this form of metal transfer from the electrode to the workpiece. It is to be understood, however, that my invention is not limited to those methods of welding in which a spray transfer of weld metal is obtained from the electrode to the workpiece since the advantages thereof will also be obtained when welding with a globular transfer of metal from the electrode to the workpiece.

It is also apparent that the electrode and the workpiece may be moved relative to one another by suitable means along a desired line of welding and that a suitable oscillatory motion may be applied to the electrode or the workpiece in order to increase the width of the weld bead being deposited. This oscillatory motion will generally be employed when producing an overlay of one metal on another as when performing surfacing operations.

It is to be understood that the method and apparatus above described and illustrated are but one embodiment of my invention and of the principles thereof involved. I, therefore, aim in the appended claims to cover all modifications of my invention which fall within the true spirit and scope thereof.

I claim:

1. In arc welding wherein a fusible electrode is initially fed through a contact means by which the total welding current is normally supplied thereto and thereafter fed through an electrode guide means which is in electrical contact with the electrode stickout from said contact means from which it is electrically insulated when the total welding current is supplied to said contact means, the method of initiating a welding operation which comprises electrically connecting the welding electrode in the welding circuit through said electrode guide means and feeding the electrode to the workpiece at a speed less than its arc welding speed until an arc has been struck, and after an arc has been struck increasing the electrode feeding speed to its said arc welding speed and without interrupting the flow of welding current to the arc interrupting the flow of welding current to said electrode from said electrode guide means and supplying the total welding current thereto through said contact means.

2. In arc welding wherein a fusible electrode is initially fed through a contact means by which the total welding current is normally supplied thereto and thereafter fed through an electrode guide means which is in electrical contact with the electrode stickout from said contact means from which it is electrically insulated when the total welding current is supplied to said contact means, the method of initiating a welding operation which comprises electrically connecting the welding electrode in the welding circuit through said electrode guide means in shunt to said contact means and feeding the electrode to the workpiece at a speed less than its arc welding speed until an arc has been struck, and after an arc has been struck increasing the electrode feeding speed to its said arc welding speed and restoring the total supply of welding current to said electrode through said contact means by interrupting the electrical connection of said electrode guide means in said welding circuit.

3. In arc welding wherein a fusible electrode is initially fed through a contact means by which the total welding current is normally supplied thereto and thereafter fed through a guide means which is in electrical contact with and supports the electrode stickout from said contact means from which it is electrically insulated when the total welding current is supplied to said contact means, the method of initiating a welding operation which comprises connecting said guide means in said welding circuit, feeding the electrode through said contact means and said guide means into engagement with a workpiece to start a welding arc upon engagement of said electrode with the workpiece, and disconnecting said guide means from the welding circuit after a welding arc has been established between the electrode and the workpiece and supplying the total welding current to the electrode through said contact means without interrupting the flow of welding current to the arc.

4. In arc welding wherein a fusible electrode is initially fed through a contact means by which the total welding current is normally supplied thereto and thereafter fed through a guide means which is in electrical contact with and supports the electrode stickout from said contact means from which it is electrically insulated when the total welding current is supplied to said contact means, the method of initiating a welding operation which comprises connecting said guide means in said welding circuit, feeding the electrode through said contact means and said guide means into engagement with a workpiece at a speed less than the speed required for welding to start a welding arc upon the engagement of the electrode with the workpiece, and after a welding arc has been established feeding the electrode at its welding speed, disconnecting said guide means from the welding circuit and supplying the total welding current to the electrode through said contact means without interrupting the flow of welding current to the arc.

5. In arc welding wherein a fusible electrode is initially fed through a contact means by which the total welding current is normally supplied thereto and thereafter fed through a guide means which is in electrical contact with and supports the electrode stickout from said contact means from which it is electrically insulated when the total welding current is supplied to said contact means, the method of initiating a welding operation which comprises connecting said guide means in said welding circuit, feeding the electrode through said contact means and said guide means into engagement with a workpiece at a speed less than that required for welding to start a welding arc upon the engagement of the electrode with the workpiece, and after a welding arc has been established smoothly changing the electrode feed speed to that required for welding, and after said welding speed of electrode feed has been established disconnecting said guide means for the welding circuit and supplying the total welding current to the electrode through said contact means without interrupting the flow of welding current to the arc.

6. Arc welding apparatus comprising a welding circuit by which current is supplied to a fusible electrode and a workpiece connected in series with one another in said circuit, contact means connected in said welding circuit for supplying the total welding current to said electrode, electrode guide means in electrical contact with the electrode stickout from said contact means from which it is electrically insulated when the total welding current is supplied to said contact means, switching means for controlling the connection of said guide means in said welding circuit, means for feeding said electrode through said contact means and said electrode guide means toward said workpiece at an arc striking speed to initiate a welding arc between said electrode and said workpiece and, after the welding arc has been established, at a welding speed that is higher than said arc striking speed, means for operating said switching means to connect said electrode guide means in said welding circuit and for operating said electrode feeding means to feed said electrode toward the workpiece at said arc striking speed, means responsive to the establishment of an arc between said electrode and said workpiece for operating said electrode feeding means at its said welding speed, and means responsive a predetermined time interval after operation of said last mentioned means for operating said switching means to disconnect said electrode guide means from said welding circuit after said electrode feeding means has attained its said welding speed of operation.

7. Arc welding apparatus comprising a welding circuit by which current is supplied to a fusible electrode and a workpiece connected in series with one another in said circuit, contact means connected in said welding circuit for supplying the total welding current to said electrode, electrode guide means in electrical contact with the electrode stickout from said contact means from which it is electrically insulated when the total welding current is supplied to said contact means, means for feeding said electrode through said contact means and said electrode guide means toward said workpiece at an arc striking speed and at a welding speed which is greater than said arc striking speed, means for adjusting said arc striking speed and said arc welding speed of said electrode feeding means, means for changing the operating speed of said electrode feeding means from its said arc striking speed to its said arc welding speed, means for connecting said electrode guide means in said welding circuit and concurrently therewith initiating operation of said electrode feeding means at its said arc striking speed, means responsive to the establishment of an arc between said electrode and said workpiece for operating said speed changing means of said electrode feeding means, and means for transferring current flow to the electrode from said guide means to said contact means by disconnecting said electrode guide means from said welding circuit after a predetermined time delay sufficient for said electrode feeding means to attain its said arc welding speed.

8. Arc welding apparatus comprising a welding circuit by which current is supplied to a fusible electrode and a workpiece connected in series with one another in said circuit, contact means connected in said welding circuit for supplying the total welding current to said electrode, electrode guide means in electrical contact with the electrode stickout from said contact means from which it is electrically insulated when the total welding current is supplied to said contact means, means for feeding said electrode through said contact means and said electrode guide means toward said workpiece at an arc striking speed and at a welding speed which is greater than said arc striking speed, means for adjusting said arc striking speed and said arc welding speed of said electrode feeding means, means for smoothly changing the operating speed of said electrode feeding means from its said arc striking speed to its said arc welding speed, means for connecting said electrode guide means in said welding circuit and concurrently therewith initiating operation of said electrode feeding means at its said arc striking speed, means responsive to the establishment of an arc between said electrode and said workpiece for operating said speed changing means of said electrode feeding means, and means for transferring current flow to the electrode from said guide means to said contact means by disconnecting said electrode guide means from said welding circuit after a predetermined time delay sufficient for said electrode feeding means to attain its said arc welding speed.

9. Arc welding apparatus comprising a welding circuit by which current is supplied to a fusible electrode and a workpiece connected in series with one another in said circuit, contact means connected in said welding circuit for supplying the total welding current to said electrode, electrode guide means in electrical contact with the electrode stickout from said contact means from which it is electrically insulated when the total welding current is supplied to said contact means, means for feeding said electrode through said contact means and said electrode guide means toward said workpiece, and means initially operable to connect said electrode guide means in said welding circuit in shunt to said contact means and thereafter operable in response to the ignition of an arc between said electrode and said workpiece for interrupting the supply of welding current to said electrode through said electrode guide means.

10. Arc welding apparatus comprising a welding circuit by which current is supplied to a fusible electrode and a workpiece connected in series with one another in said circuit, contact means connected in said welding circuit for supplying the total welding current to said electrode, electrode guide means in electrical contact with the electrode stickout from said contact means from which it is electrically insulated when the total welding current is supplied to said contact means, means for feeding said electrode through said contact means and said electrode guide means toward said workpiece at an arc striking speed and at a welding speed which is greater than said arc striking speed, means for adjusting said arc striking speed and said arc welding speed of said electrode feeding means, means for connecting said electrode guide means in said welding circuit in shunt to said contact means and concurrently therewith initiating operation of said electrode feeding means at its said arc striking speed, means responsive to the establishment of an arc between said electrode and said workpiece for changing the operating speed of said electrode feeding means from its said arc striking speed to its said arc welding speed, and means for disconnecting said electrode guide means from said welding circuit after a predetermined time delay sufficient for said electrode feeding means to attain its said arc welding speed.

11. Arc welding apparatus comprising a welding circuit by which current is supplied to a fusible electrode and a workpiece connected in series with one another in said circuit, contact means connected in said welding circuit for supplying the total welding current to said electrode, electrode guide means in electrical contact with the electrode stickout from said contact means from which it is electrically insulated when the total welding current is supplied to said contact means, means for feeding said electrode through said contact means and said electrode guide means toward said workpiece at an arc striking speed and at a welding speed which is greater than said arc striking speed, means for adjusting said arc striking speed and said arc welding speed of said electrode feeding means, means for smoothly changing the operating speed of said electrode feeding means from its said arc striking speed to its said arc welding speed, means for connecting said electrode guide means in said welding circuit in shunt to said contact means and concurrently therewith initiating operation of said electrode feeding means at its said arc striking speed, means responsive to the establishment of an arc between said electrode and said workpiece for operating said speed changing means of said electrode feeding means, and means for disconnecting said electrode guide means from said welding circuit after a predetermined time delay sufficient for said electrode feeding means to attain its said arc welding speed.

12. Arc welding apparatus comprising a welding circuit by which current is supplied to a fusible electrode and a workpiece connected in series with one another in said circuit, contact means connected in said welding circuit for supplying the total welding current to said electrode, guide means in electrical contact with the electrode stickout from said contact means from which it is electrically insulated when the total welding current is supplied to said contact means, a welding circuit contactor having an operating winding and normally open contacts controlling the connection of said guide means in said welding circuit, supply circuit conductors, a time delay relay having an operating winding and normally closed contacts connected in circuit with the operating winding of said welding contactor across said supply circuit conductors, said relay opening its said contacts after a time delay following the energization of its said operating winding, means including a motor for feeding said electrode toward said workpiece, a two-speed control for said motor, a first control circuit completion of which causes said speed control to operate said motor at one speed for feeding said electrode into arc striking engagement with said workpiece, a second control circuit completion of which causes said speed control to operate said motor at a different speed for feeding said electrode to the arc during welding, a switching relay having an operating winding, normally closed contacts completing said first control circuit, normally open contacts which on closure complete said second control circuit, and normally open contacts connected in circuit with the operating winding of said time delay relay across said supply circuit conductors, and a relay having a winding responsive to current flow in said welding circuit and normally open contacts connected in a circuit by which the winding of said switching relay is connected in the welding circuit directly across the connections thereof to said electrode and said workpiece.

13. Arc welding apparatus comprising a welding circuit by which current is supplied to a fusible electrode and a workpiece connected in series with one another in said circuit, contact means for completing a connection in said welding circuit for supplying the total welding current to said electrode, electrode guide means in electrical contact with the electrode stickout from said contact means from which it is electrically insulated when the total welding current is supplied to said contact means, means for feeding said electrode through said contact means and said electrode guide means toward said workpiece, and means initially operable to connect said electrode guide means in said welding circuit and thereafter operable in response to the ignition of an arc between said electrode and said workpiece for interrupting the supply of welding current to said electrode through said electrode guide means and for supplying the total welding current to the electrode through said contact means without interrupting the flow of welding current to the arc.

References Cited in the file of this patent
UNITED STATES PATENTS

| | | |
|---|---|---|
| 2,636,102 | Lobosco | Apr. 21, 1953 |
| 2,808,499 | Anderson | Oct. 1, 1957 |
| 2,877,339 | Catlett | Mar. 10, 1959 |